Patented Oct. 9, 1928.

1,686,807

UNITED STATES PATENT OFFICE.

FELIX GINSBACH, OF LUXEMBURG, LUXEMBURG, ASSIGNOR TO HEINRICH HORST, OF BERLIN-CHARLOTTENBURG, GERMANY.

TREATMENT OF PEAT.

No Drawing. Application filed April 23, 1927, Serial No. 186,177, and in Luxemburg April 30, 1926.

Attempts have recently been made to de-water peat by artificial means. Appreciable progress has already been made towards dispensing entirely with the tedious and ineffective drying in air. The most successful method of de-watering by artificial means, involving the application of pressure to the peat, consists in adding substances to the peat prior to its being pressed. In order to de-water to the maximum extent possible and with the least possible utilization of added substances, the process of dewatering according to the present invention is split up in known manner into a plurality of pressing operations, in which, when using dry peat as the additive substance, the latter is added, according to the invention only at the final pressing operation. Owing to the fact that the additive dry peat in the de-watering process acquires a water content substantially the same as that of the de-watered pressing material, it is necessary always to employ a definite quantity of the final product of the treatment, in order by artificial drying to restore the initial content of water to the additive peat.

It is obvious that the less the quantity of added peat that requires to be used, and the further the de-watering is carried out by pressing, the greater becomes the yield, and thus the greater the efficiency.

It is known that the water in the raw peat is the less firmly held the more water there is in the raw peat. Upon this fact is based the de-watering action of trenches dug in peat land marshes, by which in time a very considerable quantity of water can be withdrawn. It is also possible to squeeze out a small part of this superfluous water by mechanical pressure. This, however, has the disadvantage that the time required and the apparatus employed bears no relation to the moderate de-watering effect secured.

According to the present invention the pressing operation is divided up in known manner into a pre-pressing stage and a final pressing stage. The prepressing is carried out in such manner that a part of the completely de-watered pressed cake is employed as the additive substance employed in the pre-pressing operation.

The final water content attained by this means is about 80% (calculated on the raw peat,) that is to say, considerably lower than would be possible by methods hitherto employed in which the pressing operation took much longer.

The product of this pre-pressing operation is mixed with dry peat and subjected to further pressing, the final pressures during this pressing operation being advantageously much higher than during pre-pressing.

The examples hereinafter given are intended to refer to the known process and to the process according to the invention, the assumption being that the raw peat has a 90% of water content, and that according to the known process 10% of dry peat is necessary for carrying out the de-watering process. This water content can be removed by pressing, in the use of comminuted dry peat as the additive substance, but it requires such a large quantity of the additive substance that the effectiveness of the process industrially is questionable. The greater the water content of the raw peat, the less valuable are the industrial products. If, for example, the 10% of additive dry peat has a 25% water content, then in the case of a 90% initial water content in the raw peat, when 10 parts is absolutely dry, 7.5 parts of absolutely dry material in the substance are superfluous. The absolutely dry material acquires a water content equal to that of the de-watered pressing material; that is to say, if the pressing material has a 60% water content, then the 10 parts of the additive peat having an initial 25% water content and 7.5 parts of absolutely dry material produce 18.75 parts of pressed peat having a 60% water content. Accordingly, there are 8.75 parts of water to be evaporated from the additive substance to arrive at the original state. Thus, it is necessary to evaporate from the additive substance almost as much water as from the de-watered raw peat, if it is desired to produce either briquettes or powdered fuel having approximately an 18% to 25% water content.

According to the present invention the raw peat has first added to it comminuted pressing material which has been previously de-watered by means of dry peat.

Thereupon a comparatively large part of the water is pressed out at low pressure, so that the final water content in the raw peat amounts to about 80%. If to this previously de-watered peat, 10% of dry peat is added, the water content can be reduced in a short space of time to about 50 to 55%.

Example of the process according to the invention.

100 kg. of raw peat having a 90% water content (10 kg. of dry substance+90 kg. of water) are added to 20 kg. of pressed peat having a 50% water content (10 kg. of dry substance+10 kg. of water), so that for the further operation 120 kg. of mixed peat having an 83.33% water content (20 kg. of dry substance+100 kg. of water) are available.

The first pressing operation, which follows, produces:

75 kg. of pressed peat having a 73.25% water content (10+10 kg. of dry substance+45+10 kg. of water), to which is added 7.5 kg.=10% of additive dry peat having a 25% water content (5.625 kg. of dry substance+1.875 kg. of water).

The second pressing operation, which then follows, produces:

51.25 kg. of pressed substance having a 50% water content (10+10+5.625 kg. of dry substance+10+10+5.625 kg. of water).

This pressed material is composed of 20 kg. of pressed peat produced from raw peat, 20 kg. of pressed peat from the second pressing operation, and 11.25 kg. of watered peat from the additive dry peat.

According to the foregoing, 100 kg. of a 90% raw peat with approximately 7.5 kg. of additive dry peat=5.625 kg. of absolutely dry substance is de-watered till the water content is 50%. From the additive substance there has to be evaporated 11.25−7.5=3.75 kg. of water, as compared with 8.75 kg. of water in the known process. Furthermore, there are only 5.625 kg. of absolutely dry substance in the dry peat to 10 kg. of absolutely dry substance in the raw peat, as against 7.5 of absolutely dry substance in the known process.

In addition to this advantage, which has a favourable effect upon the efficiency of the material, there are a large number of practical advantages. As before mentioned, the initial water is not very firmly held by the peat. Consequently preliminary de-watering is effected at low mechanical pressures, so that the preliminary de-watering can be carried out in comparatively light machines. For the final pressing, which is effected with the usual high final pressures, a pressing material is, however, available which contains considerably more of solid substance. In the example only 10 parts of dry substance are contained in the 90% raw peat as against 20 parts in the preliminary de-watered peat. The average output at the final pressing is thus considerably greater by the use of the process according to the invention.

In order to increase the de-watering effect the peat may have added to it an electrolyte, which causes the peat mass to coagulate. By this means colloidally bound water is for the greater part freed, and it may be removed with much greater facility according to the process than if untreated raw peat is employed.

I claim:

1. A process for de-watering peat by compression in stages, the first stage consisting in compressing and de-watering raw peat after admixture with it of peat previously de-watered by compression, and the second stage consisting in again compressing and de-watering the product of the first stage after first adding dry peat, substantially as hereinbefore described.

2. A process for de-watering peat by compressing in stages as specified in claim 1 in which the first stage of the process is arrested after the main content of water has been expelled in the application of a low final pressure and in which the further stage is carried out at a high final pressure applied to material first comminuted, for example, by being broken up, substantially as hereinbefore described.

3. A process for de-watering peat by compressing in stages as specified in claim 1 comprising the further condition that a known electrolyte is added to the raw peat before being subjected to the first stage of the process, substantially as hereinbefore described.

FELIX GINSBACH.